US006620094B2

(12) United States Patent
Miller

(10) Patent No.: US 6,620,094 B2
(45) Date of Patent: Sep. 16, 2003

(54) METHOD AND APPARATUS FOR AUDIO INPUT TO IMPLANTABLE HEARING AIDS

(75) Inventor: Douglas Alan Miller, Lafayette, CO (US)

(73) Assignee: Otologics, LLC, Boulder, CO (US)

( * ) Notice: Subject to any disclaimer, the term of this patent is extended or adjusted under 35 U.S.C. 154(b) by 0 days.

(21) Appl. No.: 09/991,735

(22) Filed: Nov. 21, 2001

(65) Prior Publication Data

US 2003/0097037 A1 May 22, 2003

(51) Int. Cl.[7] .......................... H04R 25/00; A01N 1/18
(52) U.S. Cl. .............................. 600/25; 607/55; 607/57
(58) Field of Search .............................. 600/25; 607/55, 607/57, 56; 181/129–135; 455/41, 67.2, 67.3

(56) References Cited

U.S. PATENT DOCUMENTS 4,284,856 A 8/1981 Hochmair et al. .......... 179/107
4,289,935 A 9/1981 Zollner et al. .............. 179/107
4,357,497 A 11/1982 Hochmair et al. .......... 179/107
4,400,590 A 8/1983 Michelson .................. 179/107
4,419,995 A 12/1983 Hochmair et al. .......... 128/419
4,441,210 A * 4/1984 Hochmair et al. ............ 455/41
4,532,930 A 8/1985 Crosby et al. .............. 128/419
4,592,359 A 6/1986 Galbraith .................... 128/419
4,593,696 A 6/1986 Hochmair et al. .......... 128/419
4,696,287 A 9/1987 Hortmann et al. ............. 128/1
5,070,535 A 12/1991 Hochmair et al. ............ 455/41
5,282,858 A 2/1994 Bisch et al. .................. 623/10
5,425,104 A 6/1995 Shennib ....................... 381/68
5,571,148 A 11/1996 Loeb et al. .................. 607/57
5,603,726 A * 2/1997 Schulman et al. ............ 607/57
5,624,376 A 4/1997 Ball et al. ...................... 600/25
5,741,314 A 4/1998 Daly et al. ..................... 607/60
5,749,912 A 5/1998 Zhang et al. ................. 607/57
5,772,575 A 6/1998 Lesinski et al. .............. 600/25
5,776,172 A 7/1998 Schulman et al. ............ 607/56
5,795,287 A 8/1998 Ball et al. ...................... 600/25
5,800,336 A 9/1998 Ball et al. ...................... 600/25
5,814,095 A 9/1998 Muller et al. ................. 607/57
5,824,022 A 10/1998 Zilberman et al. ............ 607/57
5,876,425 A 3/1999 Gord et al. ................... 607/56
5,891,183 A 4/1999 Zierhofer ...................... 607/57
5,899,847 A 5/1999 Adams et al. ................ 600/25
5,913,815 A 6/1999 Ball et al. ...................... 600/25
5,935,166 A 8/1999 Kennedy ..................... 623/10
5,938,691 A 8/1999 Schulman et al. ............ 607/57
5,954,628 A 9/1999 Kennedy ..................... 600/25
5,993,376 A 11/1999 Kennedy ..................... 600/25
6,002,966 A 12/1999 Loeb et al. ................... 607/57
6,190,306 B1 * 2/2001 Kennedy ..................... 600/25

OTHER PUBLICATIONS

Document entitled "Direct Audio Input Boot with Microphone Switch" from Worldwide Web address: http://www.lori–unitron.com.

* cited by examiner

*Primary Examiner*—Eric F. Winakur
*Assistant Examiner*—Nikita Veniaminov
(74) *Attorney, Agent, or Firm*—Marsh Fischmann & Breyfogle LLP

(57) ABSTRACT

An interface system for semi-implantable and fully implantable hearing aid devices that provides direct delivery of audio input from external wireline and wireless sources to the speech processor of the hearing aid. The speech processor of the hearing aid processes the audio inputs to produce a processed signal for a transducer portion of the hearing aid that is implanted in a hearing impaired individual. In a semi-implantable hearing aid, the interface system could be included in the external portion of the hearing aid or be included in an audio input device that replaces the external portion of the hearing aid when sound from a wireless or wireline source is desired. In a fully implantable hearing aid, an audio input device including the interface system is provided for use when sound from a wireless or wireline source is desired.

55 Claims, 5 Drawing Sheets

METHOD AND APPARATUS FOR AUDIO INPUT TO IMPLANTABLE HEARING AIDS

FIELD OF THE INVENTION

The invention is related to the field of hearing aids, and in particular to interfacing external wireline and wireless audio sources with semi-implantable and fully implantable hearing aid devices.

BACKGROUND OF THE INVENTION

Implantable hearing aids stimulate internal components of the auditory system and are generally classified into one of two types, namely fully implantable hearing aids and semi-implantable hearing aids. In a fully implantable hearing aid, the entire device is implanted within the auditory system, e.g. the middle or inner ear. In a semi-implantable hearing aid, some of the components, typically the microphone, power supply, and speech signal processor, are externally worn, while the transducer and key support functions are implanted within the auditory system. The externally worn portion and the implanted portion communicate transcutaneously to provide audio sound to the auditory system.

Implanted hearing aids are typically used by individuals with significant loss of hearing function or damage to the auditory system. As a result, they differ in the manner by which the signal is processed and delivered to the patient. The processing step, known in the art as Speech Signal Processing ("SSP"), may include a number of steps such as amplification, frequency shaping, compression, etc. The steps in the SSP are determined by the design of the hearing aid, while the particular internal values used in the steps are generated from prescriptive parameters determined by an audiologist. Once a speech processor processes ambient acoustic signal, the altered signal is provided to an implanted transducer that stimulates the hearing impaired person's auditory system. The auditory stimulation may be done acoustically, mechanically, or electrically as a function of the type and severity of the hearing loss in the hearing impaired individual.

Hearing impaired individuals with implanted hearing aids often have difficulty distinguishing background noise from desired audio sounds. In particular, this is a problem during many forms of entertainment such as listening to music, a movie, a television program, watching a play or even talking on the telephone when crowds or other forms of background noise are present. The problem is further complicated when the location of the hearing impaired individual is removed from the source of the desired sound, such as at movie theaters and at concerts.

One solution to the above problem is provided by many public venues in the form of assisted listening devices ("ALD"). These devices come in many types. One example is a telephone receiver that includes a volume control or amplifier to increase the volume provided to the listener. Another example often used in theaters, concert halls, etc., uses special headphones located at the seats. These headphones, when worn by the listener, help to reduce background noise and provide the audio sound directly to the listener. In some cases, the audio sound is provided to the headphones via a wireless signal over an air interface. In other cases, the audio sound is provided to the headphones using a wireline connection to the audio source.

Unfortunately, the use of ALDs often results in an entirely new set of problems. In particular, the headphones and/or telephone receivers can interfere with the operation of the hearing aid resulting in a degradation of sound quality caused by feedback interference between the ALD device and the hearing aid. This interference is perceived by the hearing impaired individual in the form of a high pitch whistle in the hearing aid. Similar feedback also results during the use of headphones utilized with other non-ALD devices such as walkmans, stereos, cell phone headsets, and compact disk players. Furthermore, in the case of ALD headphones, the hearing-impaired individual often prefers not to use the headphones for reasons of comfort and the social stigma that is attached to advertising their disability in a public forum.

SUMMARY OF THE INVENTION

In view of the foregoing, a primary object of the present invention is to enhance sound perception in hearing impaired individuals utilizing both semiimplantable and fully implanted hearing aid devices. Another object of the present invention is to provide a cost effective compact hearing aid system that is easy to use. In addressing the above-described problems, the present inventors have recognized that the above objectives are achieved through a means for interfacing semi-implantable and fully implantable hearing aid devices with audio producing devices that use wireless and wireline connections.

One or more of the above-noted objectives as well as additional advantages are provided by the present invention, which includes an interface system for semi-implantable and fully implantable hearing aid devices. The interface system provides the direct delivery of audio input from external wireless and wireline sources to the speech processor of semi-implantable and fully implantable hearing aids. The speech processor of the hearing aid processes the audio inputs to produce processed signals for a transducer portion of the hearing aid that stimulates the auditory system to produce the sensation of sound.

In one aspect of the present invention, the interface system includes at least one wireline input jack. The wireline input jack receives a wireline input from a wireline source and provides a wireline audio signal to the speech processor via a transmitter, in the case of a fully implanted hearing aid, and directly to the speech processor, in the case of a semi-implanted hearing aid. The speech processor processes the wireline audio signal and provides the processed signal to the transducer.

In another aspect of the invention, the interface system also includes a wireless receiver. The wireless receiver receives a wireless audio signal from a wireless source and provides the wireless signal to the speech processor via the transmitter, in the case of a fully implanted hearing aid, and directly to the speech processor, in the case of a semi-implanted hearing aid.

In another aspect of the invention, the interface system also includes a second wireless receiver. The second wireless receiver, receives a second wireless signal from a second wireless source and provides the second wireless signal to the speech processor via the transmitter, in the case of a fully implanted hearing aid, and directly to the speech processor, in the case of a semi-implanted hearing aid. The second wireless signal is typically different from the first wireless signal to provide the advantage of allowing the hearing aid to receive direct audio input from audio devices using different wireless protocols.

In another aspect of the invention, the interface system could include volume control logic that controls the perceived volume of an audio input from the wireline or wireless source. In one example of the present invention, the volume control logic could be a digital attenuator volume control on a main electrical circuit and a volume control switch for adjusting the amplitude of a signal.

In another aspect of the invention, the interface system includes mode selection logic to control the delivery of the wireless and/or wireline signals received in a hearing aid device. Specifically, the mode selection logic includes a user interface, such as a switch, that permits a user to select a source for a desired audio sound. The mode selection logic filters the signal received from the selected source and provides the filtered signal to the volume control logic.

In one embodiment of a semi-implantable hearing aid device, the interface system is included in a non-implanted portion of the hearing aid, e.g. a behind the ear unit. In this embodiment, the interface system is able to receive ambient acoustic sound from a microphone in the non-implanted portion and receive the direct input of audio signal from wireline or wireless sources.

In another embodiment of a semi-implantable hearing aid device, the interface system is included in a separate audio input device designed to temporarily replace, or be worn in conjunction with, the non-implanted portion of the hearing aid when a user desires the direct audio input from a wireline or wireless source. When the external input is no longer desired, the audio input device is removed or replaced by the external portion.

In one embodiment of a fully implantable hearing aid device, the interface system is also included in a separate audio input device, which is mountable in proximity to the implanted device. When a user wears the audio input device, direct audio input is provided from wireline and/or wireless sources into the implanted hearing aid. Specifically, when the audio input device is worn, it transcutaneously provides the wireless and/or wireline signals to the speech processor contained in the implanted hearing aid. In another example of this embodiment, the audio input device could also include a means for inductively coupling power to recharge an implanted power source for the hearing aid.

The present invention may be utilized in a variety of different settings to provide audio input directly from wireline or wireless sources into a fully implantable or semi-implantable hearing aid. For example, the present invention could provide audio input from walkmans, compact disk players, cellular telephones, televisions, stereos, etc. In another example, a wireline signal provided by a wireline assisted listening device, e.g. the signal normally provided to the headphones, could be directly input into the present interface system, and provided to the speech processor of a semi-implantable or fully implantable device. In still yet another example, different wireless signals from different wireless devices, e.g. an ALD device using a radio frequency, and an ALD device using an FM frequency, an ALD device using an infrared frequency, could be directly received by the present interface system and provided to the speech processor of a semi-implantable or.fully implantable device. Thus, in the context of the present invention, the wireless source could be any source that produces a signal representative of sound or that is convertible into a signal representative of sound and provides the signal over an air interface. Also, in the context of the present invention, the wireline source could be any device that produces a signal representative of sound or that is convertible into a signal representative of sound and provides the signal over a wire interface.

Numerous additional aspects and advantages of the present invention will become apparent to those skilled in the art upon consideration of the following figures and description.

BRIEF DESCRIPTION OF THE DRAWINGS

The same reference number represents the same element on all drawings.

DETAILED DESCRIPTION

Figure 1:
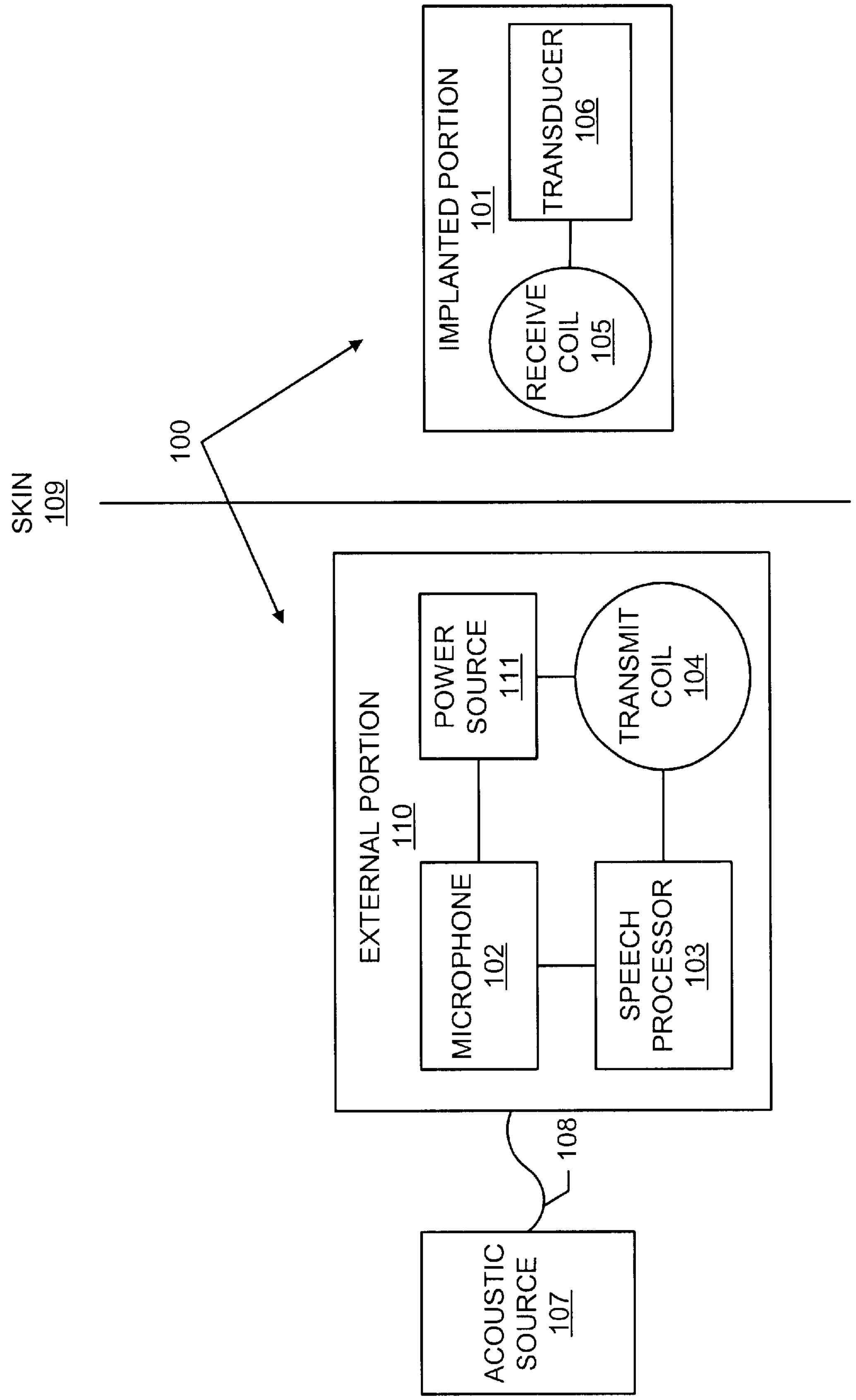
FIG. 1 Prior Art
FIG. 1 illustrates a prior art semi-implantable hearing aid.
Figure 2:
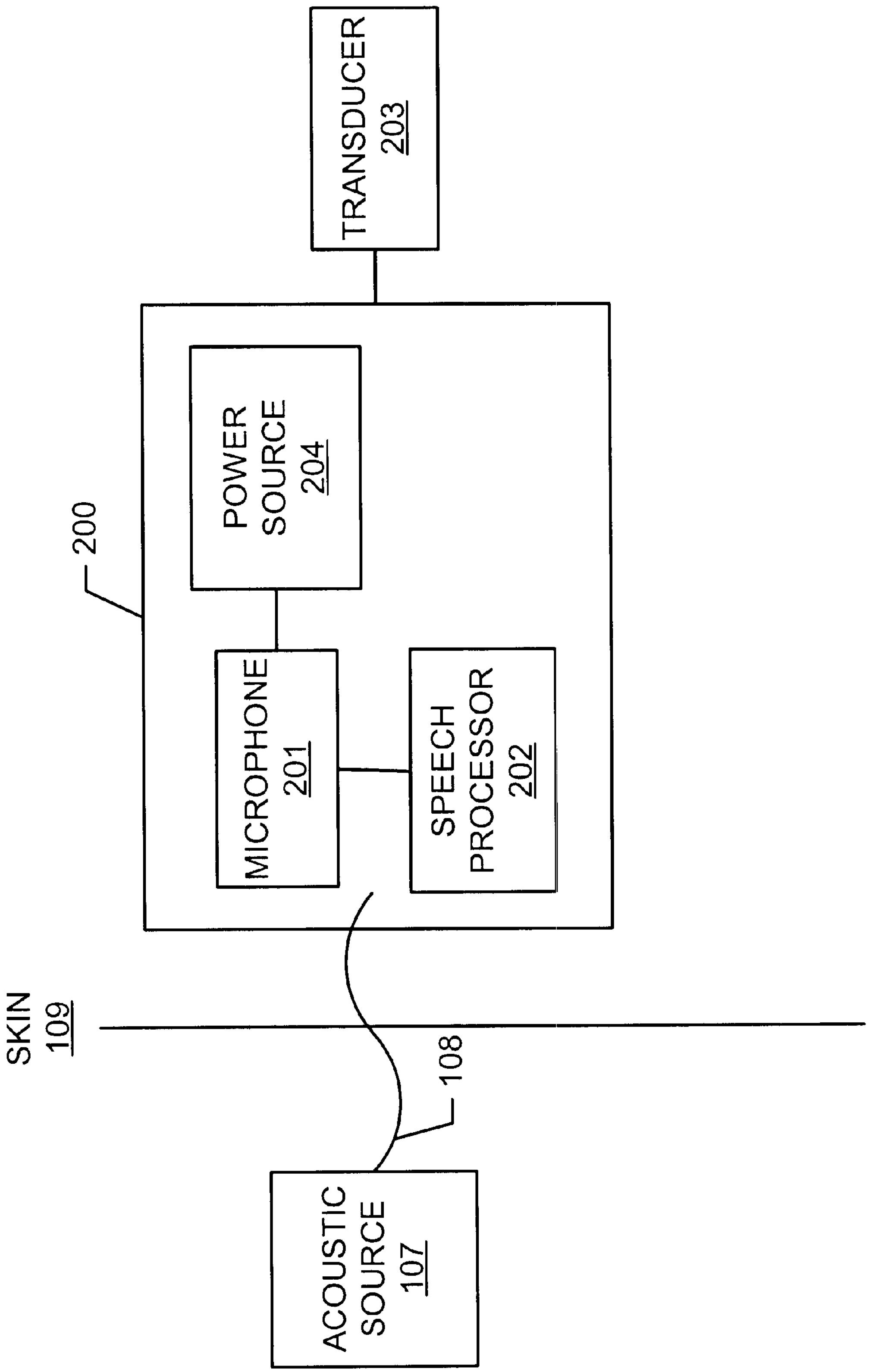
FIG. 2 Prior Art
FIG. 2 illustrates a prior art fully-implantable hearing aid.

FIGS. 1 and 2 depict prior art representations of a semi-implantable hearing aid and fully implantable hearing aid respectively. Those skilled in the art will appreciate that FIGS. 1 and 2 are schematic diagrams to illustrate the primary components and the operation of semi-implantable and fully implantable hearing aids. Therefore, the exact layout and architecture of an individual device could vary as a function of individual designs.

FIG. 1 depicts a schematic diagram of a semi-implantable hearing aid 100. The semi-implantable hearing aid 100 includes an external portion 110 separated from an internal or implanted portion 101 by skin 109. The external portion 110 includes an omni directional microphone 102 electrically connected to speech processor 103, a transmit coil 104, and a power source 111. The external portion 110 is typically packaged in a conventional housing that is worn behind the ear of a user. The internal or implanted portion 101 includes a receive coil 105 electrically connected to a transducer 106. The transducer 106 mechanically, electrically or acoustically couples to a component of the human auditory system as a function of the device type.

Operationally, ambient acoustic sounds 108 are received in the microphone 102 from an acoustic source 107 and are provided to the speech processor 103. The acoustic source 107 could be any source of audible sound. For example, the acoustic source 107 could be another person speaking, a stereo, a television set etc. The speech processor 103 processes the acoustic sound 108 to generate a processed audio signal. The processing of the acoustic sound to generate the audio signal could include amplifying or filtering by the speech processor 103 to emphasize or de-emphasize various frequency ranges in accordance with the individual needs of the user. Additionally, the generated audio signal could be a digital or an analogue signal. In the case of a digital signal, the signal processing is typically very precise to provide a signal that maximizes compensation for deficiencies in the users hearing.

The generated audio signal is inductively coupled transcutaneously by the transmit coil 104 to the receive coil 105. The receive coil 105 provides the audio signal to the transducer 106. The transducer 106 converts the audio signal into one of a mechanical, electrical or acoustic stimulation representative of the acoustic sounds 108.

FIG. 2 depicts a schematic representation of a fully implantable hearing aid 200. Fully implantable hearing aids function in much the same way as their semi-implantable counterparts except that all of the components are implanted beneath a users skin 109. The fully implantable hearing aid 200 includes an omni directional microphone 201, a speech processor 202, a power source 204, and a transducer 203. In a typical design, the microphone 201, speech processor 202 and the power source 204 are implanted just under the skin 109 to facilitate the reception of the acoustic sounds 108. The transducer 203 is implanted within the middle ear cavity or cochlea as a function of the implant type. In the case of the fully implanted hearing aid 200, the power source 204 includes electronic circuitry to enable it to receive an inductively coupled charge. In one example of such a device, the electronic circuitry could be an electromagnetic coil that forms the primary windings of a transformer. When a charge is desired, a second electromagnetic coil forming the secondary windings of the transformer is placed adjacent to the skin 109 near the electronic circuitry so that the primary and secondary coils electromagnetically couple to form a transformer through which electrical energy is conveyed to charge the power source 204.

Figure 3A:
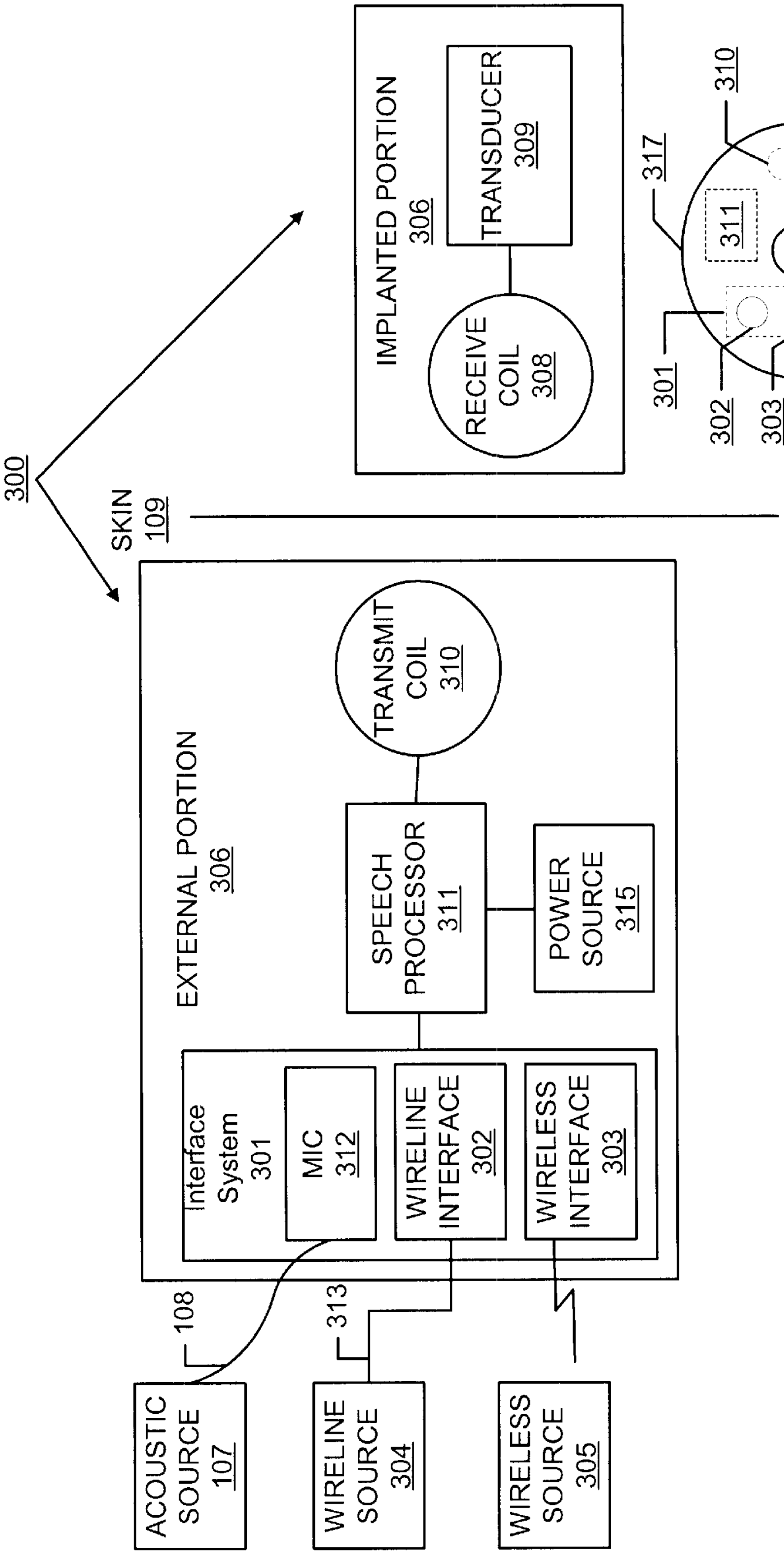
FIG. 3*a* illustrates an example of a semi-implantable hearing aid and interface system according to the present invention.
Figure 3B:
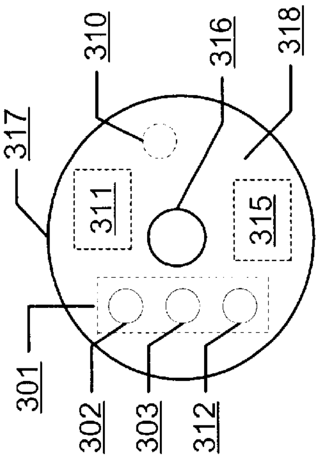
FIG. 3*b* illustrates an example of an audio input device and interface system for a semi-implantable hearing aid.

FIG. 3*a* depicts an example of a semi-implantable hearing aid 300 according to the present invention. FIG. 3*b* depicts an example of an audio input device 317 according to the present invention. As will become apparent from the following description, the semi-implantable hearing aid 300 provides a user with the ability to receive sound from an ambient acoustic source 107, a wireline source 304, and/or a wireless source 305. The audio input device 317 on the other hand, is designed for utilization with the conventional semi-implantable hearing aid 100 to provide the functionality and advantages of the present invention, namely being able to receive sound from an ambient acoustic source 107, the wireline source 304, and/or the wireless source 305.

Referring first to FIG. 3*a*, an acoustic source 107, a wireline source 304, a wireless source 305 and the hearing aid 300 are depicted. The hearing aid 300 comprises an external portion 306 separated from an internal or implanted portion 307 by skin 109. The implanted portion 307 includes a receive coil 308 and a transducer 309. The external portion 306 comprises speech processor 311 connected to a transmit coil 310, a power source 315 and an interface system 301. The power source 315, transmit coil 310, and speech processor 311 could be any device or circuitry configured to operate with the interface system 301. For example, the speech processor 311, power source 315, and transmit coil 310 could be conventional components.

The interface system 301 includes an omni-directional microphone 312 and at least one wireline interface 302. The interface system 301 could also include at least one wireless interface, such as wireless interface 303. The wireline source 304.is connected to the wireline interface 302 by a wireline 313 and could be any device configured to receive or produce an acoustic sound and deliver the sound to the wireline interface 302 over the wireline 313. Some examples of the wireline source 304 include without limitation, compact disk players, stereos, televisions, radios, cell phones, microphones etc.

The wireless source 305 could be any device configured to receive or produce a desired sound and deliver the desired sound over a wireless communication path to the wireless interface 303. Some examples of the wireless source 304 include assisted listening device systems that are utilized in public forums such as theaters, concert halls etc. These systems typically deliver a desired sound to a headphone or speaker unit using an FM radio frequency or infrared ("IR") frequency.

The wireline interface 302 could be any device or circuitry receives a wireline audio signal over the wireline 313 from wireline source 304. In one example of the present invention, the wireline interface 302 is an audio input jack that permits connection of devices such as compact disk player, cell phone, television, etc. directly to the hearing aid 300. In another example of the present invention, the wireline interface 302 could include multiple different types of audio input jacks that accommodate different wireline connections included on different wireline devices. For example, the wireline interface 302 could include a set of three different audio input jacks so that devices using various types of connections can be connected to the hearing aid 300. In the case of multiple input jacks, the different jacks could also be color coded to identify the type of device the jack accommodates or a characteristic about the jack such as a stereo or mono input.

In one specific example of the present invention, the wireline source 304 could be a miniature directional microphone connected to the wireline interface 302 and used to focus in on a desired sound. Advantageously, the microphone provides a reduced signal to noise level through the focused input of the desired sound. The microphone is also relatively unobtrusive as it is easily run behind the ear to connect under a shirt collar or other article of clothing worn by the user of the hearing aid 300. The microphone would be ideal where the user is in conversation with another individual within a large crowd or other scenario where significant background noise exists. Alternatively, those skilled in the art will appreciate numerous other examples where the miniature directional microphone could be utilized to receive and provide desired sounds to the user of the hearing aid 300.

The wireless interface 305 could be any device or circuitry configured to receive a wireless signal over a wireless communication path and deliver the wireless signal to the speech processor 311. In one example of the present invention, the wireless interface 303 could be a radio frequency receiver that receives a radio frequency from a conventional radio frequency assisted listening device. In another example of the invention, the wireless interface 303 could be an infrared interface that receives an infrared signal from a conventional infrared assisted listening device. It will be appreciated that the wireline interface 302 and the wireless interface 303 could also include modulation/demodulation circuitry that converts a received signal into an audio signal for the speech processor 311. Advantageously, the wireline interface 302 and the wireless interface 303 provide a means for a user of the hearing aid 300 to receive a direct input from wireless sources and wireline devices.

Operationally, the hearing aid 300 receives ambient acoustic sounds 108 from the acoustic source 107 using the microphone 312. Additionally, the hearing aid 300 receives wireless and wireline signals representative of sound directly from the wireline source 304 and the wireless source 305. It should be noted that there are multiple methods that could be used to control the delivery source for a desired sound, i.e. what order or precedence is given to the microphone 312, the wireline interface 302, and the wireless interface 303 during signal delivery. In one example, electronic circuitry and/or software could be included in the interface system 301 that creates a hierarchy of signal dominancy. The circuitry and/or software could also be separately located in each of the microphone 312, wireline interface 302, and wireless interface 303. In one example, the circuitry and/or software could cause the wireline signal to dominate over the acoustic sound 108 or the wireless signal when the wireline 313 is connected to the hearing aid

300. In this case the other signals could be completely or at least partially masked by the wireline signal as a matter of design choice In another example, the circuitry or software could mask signals according to the signal strength. In this case the dominant signal representative of the dominant sound is provided to the user of the hearing aid 300 while the other sounds are partially or completely masked. This provides the advantage of allowing the user to receive the dominant signal, which in most cases corresponds to the desired sound, while partially or completely masking signals from the other sources. Thus, when the wireline 313 is connected, it would provide the dominant signal unless a significantly louder ambient sound is received from the acoustic source 107. Similarly, when a wireless signal is received it would provide the dominant signal unless a significantly louder ambient sound 108 is received from the acoustic source 107. When-the wireline 313 is disconnected or the wireless signal is no longer provided, the signal from the acoustic source 107 is the dominant signal and is provided to the user of the hearing aid 300. As will become apparent from the following description, in another example of the invention, mode selection circuitry could also be included that permits the user to select a desired source, e.g. the microphone 312, the wireline interface 302, or the wireless interface 305.

Referring to FIG. 3*b*, the audio input device 317 includes the interface system 301, the power source 315, the speech processor 311, and the transmit coil 310 within a compact housing 318. The audio input device 317 is a separate device designed to replace the external portion 110 of the semi-implantable hearing aid 100. The audio input device 317 enhances the operation of the device 100 by providing sound to a user of the device 100 from the wireline source 304, the wireless source 305 as well as the ambient acoustic sounds that device 100 is designed to receive during conventional operation. The audio input device 317 includes an attachment means 316 that is used to connect the audio input device 317 to the skin 109 adjacent the implanted receive coil 105. The attachment means 316 could be any means that provides a connection to the user's skin 109 in proximity to the coil 105. One example of the attachment means 316 is a small magnet that couples the audio input device 317 to the skin 109 by magnetically coupling to the receive coil 105 located just under the skin 109.

The audio input device 317 is designed for utilization when the user of the conventional semi-implantable hearing aid 100 desires to receive the wireless or wireline signals directly from the wireline source 304 or wireless source 305. For example, if the user desires to listen to a CD on a compact disk player, the audio input device 317 including wireline interface 302, provides a direct electrical input for the sound to the transducer 106. In another example the user may visit a theater equipped with a wireless or wireline assisted listening device. In this case, the audio input device 317 is used to directly receive and provide sounds to the transducer 106 for the user.

Figure 4:
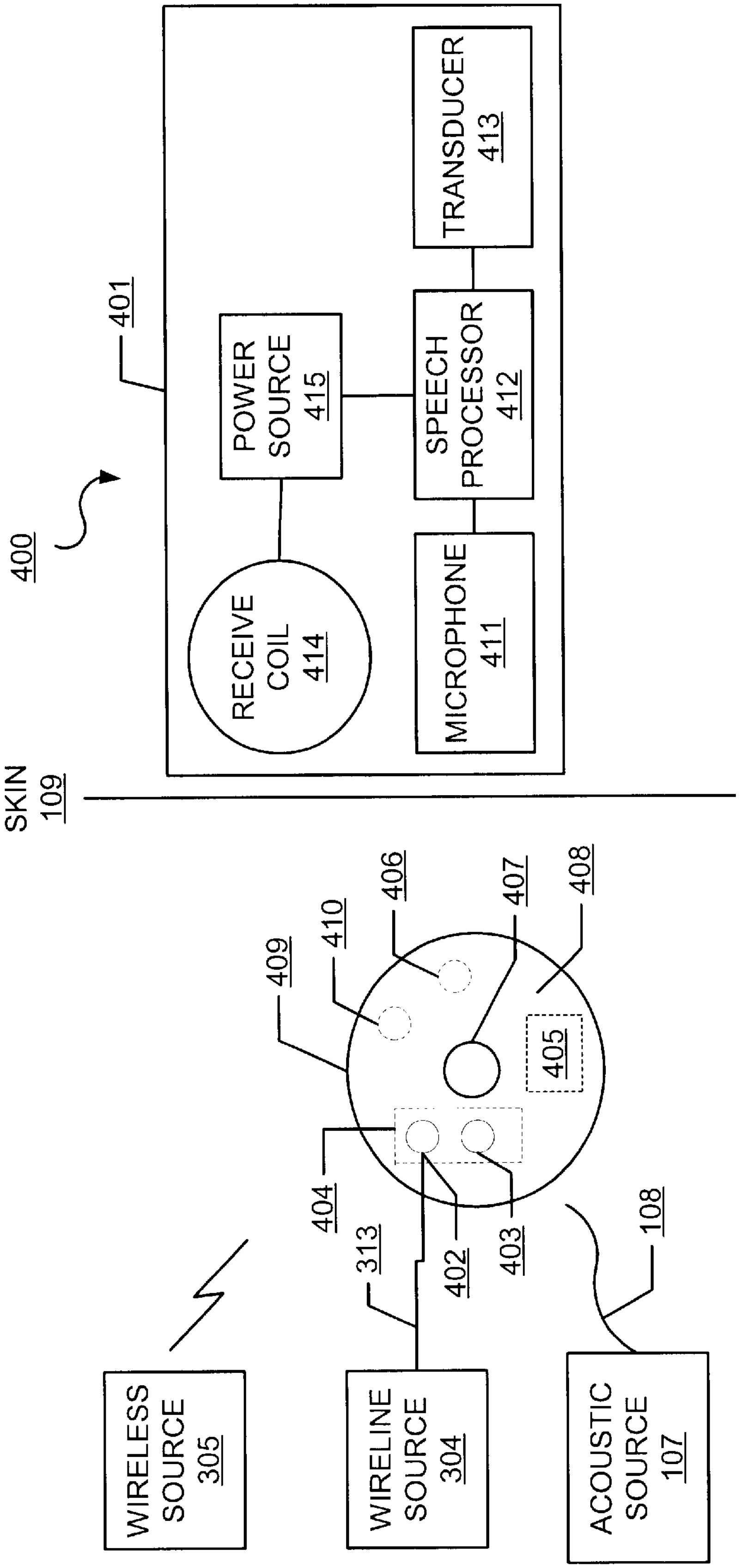
FIG. 4 illustrate a fully implantable hearing aid, interface system, and audio input device according to the present invention.

FIG. 4 depicts an example of a fully implantable hearing aid 400, an audio input device 409, the acoustic source 107, the wireline source 304, and the wireless source 305. The hearing aid 400 comprises an implanted portion 401 that includes an omni-directional microphone 411, a power source 415, and a speech processor 412. The implanted portion 401 also includes a receive coil 414 for receiving the inductively coupled wireline and wireless signals from the audio input device 409.

The audio input device 409 includes an interface system 404 a transmit coil 406, a recharge coil 410, a connection means 407, and a power source 405. The interface system 404 includes a wireless interface 402 and a wireline interface 403. The audio input device 409 is substantially similar to the audio input device 317, except that it does not have speech processor 311 or microphone 312 as it utilizes the speech processor 412 and microphone 411 in the implanted portion 401. As with the semi-implantable hearing aid 100, the audio input device 409 is used to provide sound directly into the hearing aid 400 from the wireless source 305 and the wireline source 304. When a user having a fully implanted hearing aid 400 desires to receive sound from one of the wireline or wireless sources, 305 and 304, the audio input device 409 is connected to skin 109 adjacent the receive coil 414. When the user no longer desires to receive sound from the wireline or wireless sources, 305 and 304, the audio input device 409 is removed and the hearing aid 400 operates in a conventional manner to receive ambient acoustic sound 108 using the implanted microphone 411. When the audio input device 409 is used with the hearing aid 400, any of the above described methods for controlling the delivery source could be utilized.

Advantageously, the audio input device 409 also includes the recharge coil 410 to recharge the implanted power source 415 when the audio input device 409 is used. The power source 415 includes an electromagnetic coil that forms the primary windings of a transformer. The recharge coil 410 comprises a coil forming the secondary windings of the transformer. When the audio input device 409 is connected to the skin 109 adjacent the implanted hearing aid 400, the primary and secondary coils electromagnetically couple to form a transformer through which electrical energy is conveyed to charge the power source 415.

Figure 5:
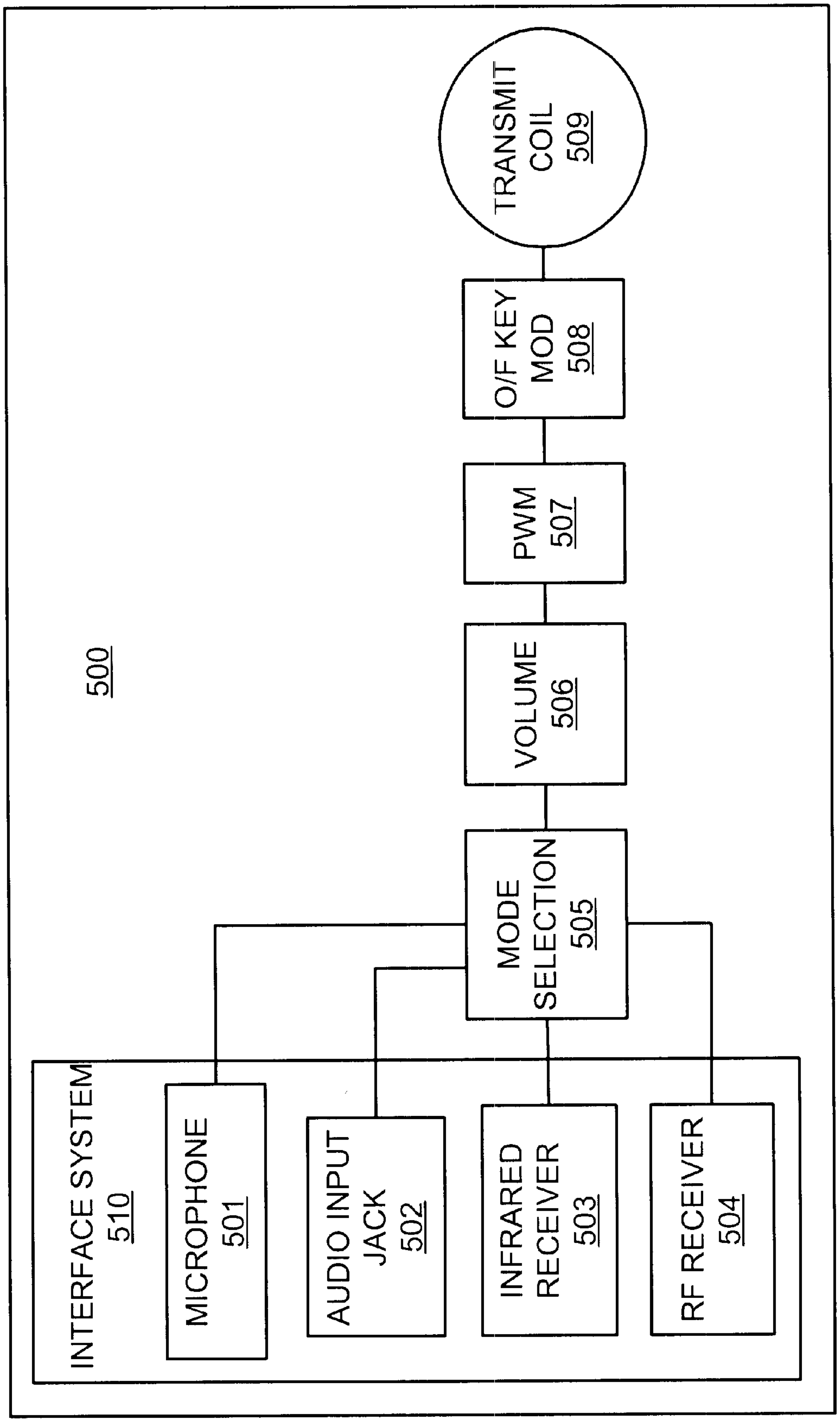
FIG. 5 illustrates additional details of an audio input device and interface system according to the present invention.

FIG. 5 illustrates another example of an audio input device 500 according to the present invention. Those skilled in the art will appreciate that some or all of the features of the audio input device 500 could be incorporated into the audio input devices 317 and 409 to form various other examples of the present invention.

The audio input device 500 comprises an interface system 510, mode selection logic 505, volume control logic 506, pulse width modulation ("PWM") logic 507, on-off key modulation logic 508 and a transmit coil 509. The interface system 510 comprises an microphone 501, an audio input jack 502, an infrared receiver 503 and a radio frequency receiver 504. The mode selection logic 505 is electrically connected to the omni-directional microphone 501, the audio input jack 502, the infrared receiver 503, the radio frequency receiver 504, and the volume control logic 506. The PWM logic 507 is electrically connected to the volume control logic 506 and the on-off key modulation logic 508. The on-off key modulation logic 508 is electrically connected to the transmit coil 509.

The mode selection logic 505 could be any circuitry or software configured to control the delivery of signals received from the microphone 501, the audio input jack 502, the infrared receiver 503, and the radio frequency receiver 504 of the interface system 510. Specifically, the mode selection logic includes a user interface, such as a switch, that permits a user to select a source for a desired audio sound. The mode selection logic 505 filters the signal received from the selected one of the omni-directional microphone 501, the audio input jack 502, the infrared receiver 503 and the radio frequency receiver 504 and provides the filtered signal to the volume control logic 506.

The volume control logic 506 could be any circuitry and/or software that controls the perceived volume for the user of the filtered signal. The volume control logic 506 provides the outputted signal to the PWM logic 507. In one example of the present invention, the volume control logic 506 is a digital attenuator volume control on a main electrical circuit and a volume control switch for adjusting the amplitude of the output signal to the PWM logic 507

The PWM logic 507 and the on-off key modulation logic 508 are conventional frequency shaping and digital conversion modulation logic blocks that process signals according to a prescription for an individual user of the audio input device 500. The steps are determined by the design of an individual hearing aid. The particular interval values used are generated from prescriptive parameters for the user. Those skilled in the art will appreciate that various different frequency shaping and modulation techniques could be used as a matter of design choice. The output of the PWM logic 507 and the on-off key modulation block 508 is provided to the transmit coil 509 and ultimately to an implanted portion of a semi or fully implanted hearing aid.

In this example the interface system 510 includes not only the microphone 501 and an audio input jack 502, but also includes a pair of wireless receivers, 503 and 504, of a different type. Advantageously, this permits a user of the audio input device 500 to receive multiple types of wireless frequencies. This is important in the case of different assisted listening devices that utilize different types of wireless signals. If a user visits one location using an RF assisted listening device, the user selects the RF receiver in the mode selection logic 505. If the user visits another location using an infrared assisted listening device the user selects the infrared receiver 504. If the user desires to listen to a wireline device or visits a venue with a wireline assisted listening device, the user selects the audio input jack 502 and connects the wireline to the audio input device 500.

The above-described elements can be comprised of instructions that are stored on storage media. The instructions can be retrieved and executed by a processing system. Some examples of instructions are software, program code, and firmware. Some examples of storage media are memory devices and integrated circuits. The instructions are operational when executed by the processing system to direct the processing system to operate in accord with the invention. The term "processing system" refers to a single processing device or a group of inter-operational processing devices. Some examples of processing systems are integrated circuits and logic circuitry. Those skilled in the art are familiar with instructions, processing systems, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A hearing aid system, comprising:

a speech processor to process a wireline audio signal to generate a processed signal;

a transducer implantable within an ear to use one of the processed signal and the wireline audio signal to stimulate a component of the ear;

a first interface to receive a wireline input from a wireline source providing the wireline audio signal;

an external transmitter to transcutaneously transmit one of the wireline audio signal and the processed signal; and an implantable receiver for receiving the one of the wireline signal and the processed signal.

2. The system of claim 1 comprising:

a second interface to receive a first wireless audio signal from a first wireless source providing the first wireless audio signal;

wherein the speech processor processes the first wireless audio signal to generate the processed signal and the transmitter transcutaneously transmits one of the first wireless audio signal and the processed signal.

3. The system of claim 2 wherein the first wireless signal is an infrared wireless signal.

4. The system of claim 2 comprising:

a third interface to receive a second wireless audio signal from a second wireless source providing the second wireless audio signal;

wherein the second wireless audio signal is different in type from the first wireless audio signal, and wherein the speech processor processes the second wireless audio signal to generate the processed signal and the transmitter transcutaneously transmits one of the second wireless audio signal and the processed signal.

5. The system of claim 4 wherein the speech processor pulse width modulates the first wireless signal, the second wireless signal, and the wireline signal to generate the processed signal.

6. The system of claim 4 wherein the speech processor on-off key modulates the first wireless signal, the second wireless signal, and the wireline signal to generate the processed signal.

7. The system of claim 4 wherein the second wireless signal is a radio frequency signal.

8. The system of claim 4 comprising;

a microphone to receive acoustic sound from an external source providing the acoustic sound;

wherein the speech processor processes the acoustic sound to generate the processed signal and transmitter transcutaneously transmits one of the acoustic sound and the processed signal.

9. The system of claim 8 wherein the first interface is an audio input jack, the second interface is a first wireless receiver, and the third interface is a second wireless receiver.

10. The system of claim 9 comprising:

mode selection logic to select between one of the first wireless receiver, the second wireless receiver, the audio input jack, and the microphone to receive a respective one of the first wireless signal, the second wireless signal, the wireline signal and the sound waves in response to a user input; and volume control logic to increase or decrease a perceived volume of the first wireless signal, the second wireless signal, the wireline signal and the sound waves from the selected one of the first wireless receiver, the second wireless receiver, the audio input jack, and the microphone.

11. The system of claim 1 wherein the wireline source is a directional microphone.

12. The system of claim 1 wherein the wireline source is a cellular telephone.

13. The system of claim 1 wherein the wireline source is a compact disk player.

14. An audio input device for a fully implantable and a semi-implantable hearing aid, the device comprising:

a housing including means for externally mounting the housing in proximity to an ear;

a first interface within the housing to receive, in a detachable manner, a connector for attaching a wireline carrying a wireline audio signal from a wireline source;

a transmitter within the housing to transcutaneously transmit the wireline audio signal to a transducer implanted within the ear; and a power source to provide power to the-audio-input-device.

15. The device of claim 14 comprising:

means within the housing to inductively couple power to recharge an implanted power source.

16. The device of claim 14 comprising:

a second interface to receive a first wireless audio signal from a first wireless source providing the first wireless audio signal, wherein the transmitter transcutaneously transmits the first wireless audio signal to the transducer.

17. The device of claim 16 wherein the first wireless signal is an infrared wireless signal.

18. The device of claim 16 comprising:

a third interface to receive a second wireless audio signal from a second wireless source providing the second wireless audio signal, wherein the second wireless audio signal is different in type from the first wireless audio signal and the transmitter transcutaneously transmits the second wireless audio signal to the transducer.

19. The device of claim 18 wherein the second wireless signal is a radio frequency signal.

20. The device of claim 18 wherein the first interface is an audio input jack, the second interface is a first wireless receiver, and the third interface is a second wireless receiver.

21. The device of claim 20 comprising:

mode selection logic to select between one of the first wireless receiver, the second wireless receiver, and the audio input jack to receive a respective one of the first wireless audio signal, the second wireless audio signal, and the wireline signal in response to a user input; and volume control logic to increase or decrease a perceived volume of the first wireless audio signal, the second wireless audio signal, and the wireline audio signal from the selected one of the first wireless receiver, the second wireless receiver, and the audio input jack.

22. The device of claim 14 wherein the wireline source is a directional microphone.

23. The device of claim 14 wherein the wireline source is a cellular telephone.

24. The device of claim 14 wherein the wireline source is a compact disk player.

25. A fully implantable hearing aid system comprising:

a speech processor implantable within an ear to process a wireline audio signal to generate a processed signal;

a transducer implantable within the ear to use the processed signal to stimulate a component of the ear;

a first power source implantable within the ear to provide power to the speech processor and the transducer; and an audio input device externally mountable in proximity to the ear comprising:

a first interface to receive a wireline input from a wireline source providing the wireline audio signal;

a transmitter to transcutaneously.transmit the wireline audio signal to the speech processor; and a second power source to provide power to the first interface and the transmitter.

26. The device of claim 25 comprising:

means within the audio input device to recharge the first power source.

27. The device of claim 26 wherein the audio input device comprises:

a second interface to receive a first wireless audio signal from a first wireless source providing the first wireless audio signal;

wherein the transmitter transcutaneously transmits the first wireless audio signal to the speech processor.

28. The device of claim 27 wherein the first wireless signal is an infrared wireless signal.

29. The device of claim 27 wherein the audio input device comprises:

a third interface to receive a second wireless audio signal from a second wireless source providing the second wireless audio signal;

wherein the second wireless audio signal is different in type from the first wireless audio signal and the transmitter transcutaneously transmits the second wireless audio signal to the speech processor.

30. The device of claim 29 wherein the second wireless signal is a radio frequency signal.

31. The device of claim 29 wherein the first interface is an audio input jack, the second interface is a first wireless receiver, and the third interface is a second wireless receiver.

32. The device of claim 31 where the interface system comprises:

mode selection logic to select between one of the first wireless receiver, the second wireless receiver, and the audio input jack to receive a respective one of the first wireless audio signal, the second wireless audio signal, and the wireline signal in response to a user input; and volume control logic to increase or decrease a perceived volume of the first wireless audio signal, the second wireless audio signal, and the wireline audio signal from the selected one of the first wireless receiver, the second wireless receiver, and the audio input jack.

33. The device of claim 25 wherein the wireline source is a directional microphone.

34. The device of claim 25 wherein the wireline source is a cellular telephone.

35. The device of claim 25 wherein the wireline source is a compact disk player.

36. A method for providing an audio signal to a hearing aid that is at least partially implanted within an ear, the method comprising:

receiving in an external interface mountable in proximity to the ear, a wireline audio signal from a wireline source;

processing the wireline audio signal to produce a processed signal; and transcutaneously transmitting one of the wireline audio signal and the processed signal to an implanted transducer; and using one of the processed signal and the wireline audio signal to stimulate a component of the ear.

37. The method of claim 36 comprising:

receiving in the external interface, a first wireless signal from a first wireless source; and processing the first wireless audio signal to produce the processed signal;

transcutaneously transmitting one of the first wireless audio signal and the processed signal to the implanted transducer; and using one of the processed signal and the first wireless audio signal to stimulate a component of the ear.

38. The method of claim 37 comprising:

receiving in the external interface, a second wireless audio signal from a second wireless source, wherein the second wireless audio signal is different in type from the first wireless audio signal;

processing the second wireless audio signal to produce the processed signal;

transcutaneously transmitting one of the second wireless audio signal and the processed signal to the implanted transducer; and using one of the processed signal and the second wireless audio signal to stimulate a component of the ear.

39. The method of claim 38 the method comprising:

responsive to a first input from a user, selecting between one of a first wireless receiver, a second wireless receiver and an audio input jack to receive a respective one of the first wireless signal, the second wireless signal, and the wireline signal.

40. The method of claim 39 the method comprising:

responsive to a second input from the user, increasing a perceived volume of the first wireless signal, the second wireless signal, and the wireline signal from the selected one of the first wireless receiver, the second wireless receiver, and the audio input jack; and responsive to a third input from the user, decreasing a perceived volume of the first wireless signal, the second wireless signal, and the wireline signal from the selected one of the first wireless receiver, the second wireless receiver, and the audio input jack.

41. An audio input device for a fully implantable and a semi-implantable hearing aid, the device comprising:

a first housing including a means for externally mounting the housing in proximity to an ear;

at least one interface in the first housing to receive one of a first wireless audio signal and a first wireline audio signal from one of a first wireless source providing the first wireless audio signal and a first wireline source providing the first wireline audio signal;

a transmitter to transcutaneously transmit the received one of the first wireless audio signal and the first wireline audio signal to a transducer implanted within the ear; and a power source to provide power to the audio input device.

42. The device of claim 41 comprising:

means in the first housing to inductively couple power to recharge an implanted power source.

43. The device of claim 41 wherein the transmitter is located in the first housing.

44. The device of claim 41 wherein the at least one interface is located in the first housing and the transmitter is located in a second housing.

45. The device of claim 44 wherein one of the first housing and the second housing is local table behind the ear of a patient.

46. A method for providing an audio signal to a hearing aid that is at least partially implanted within an ear, the method comprising:

receiving in an external interface mountable in proximity to the ear, a first wireless audio signal from a first wireless source;

processing the first wireless audio signal to produce a processed signal; and transcutaneously transmitting one of the first wireless audio signal and the processed signal to an implanted transducer; and using one of the processed signal and the first wireless audio signal to stimulate a component of the ear.

47. The method of claim 46, the method comprising:

receiving in the external interface, a wireline audio signal from a wireline source;

processing the wireline audio signal to produce the processed signal; and transcutaneously transmitting one of the wireline audio signal and the processed signal to the transducer; and using one of the processed signal and the wireline audio signal to stimulate the component of the ear.

48. The method of claim 47 comprising:

receiving in the external interface, a second wireless audio signal from a second wireless source, wherein the second wireless audio signal is different in type from the first wireless audio signal;

processing the second wireless audio signal to produce the processed signal;

transcutaneously transmitting one of the second wireless audio signal and the processed signal to the transducer; and using one of the processed signal and the second wireless audio signal to stimulate the component of the ear.

49. The method of claim 48 the method comprising:

responsive to an input from a user, selecting between one of the first wireless interface, the second wireless interface and the wireline interface to receive a respective one of the first wireless signal, the second wireless signal, and the wireline signal.

50. An audio input device for a fully implantable and a semi-implantable hearing aid, the device comprising:

a housing including a means for externally mounting the housing in proximity to an ear;

a first interface within the housing to receive a wireline input from a wireline source providing a wireline audio signal;

a transmitter to transcutaneously transmit the wireline audio signal to a transducer implanted within the ear;

a power source to provide power to the audio input device; and means within the housing to inductively couple power to recharge an implanted power source.

51. An audio input device for a fully implantable and a semi-implantable hearing aid, the device comprising:

a housing including a means for externally mounting the housing in proximity to an ear;

a first interface within the housing to receive a wireline input from a wireline source providing a wireline audio signal;

a transmitter to transcutaneously transmit the wireline audio signal to a transducer implanted within the ear;

a power source to provide power to the audio input device; and a second interface to.receive a first wireless audio signal from a first wireless source providing the first wireless audio signal, wherein the transmitter transcutaneously transmits the first wireless audio signal to the transducer.

52. The device of claim 51 comprising:

a third interface-to receive a second wireless audio signal from a second wireless source providing the second wireless audio signal, wherein the second wireless audio signal is different in type from the first wireless audio signal and the transmitter transcutaneously transmits the second wireless audio signal to the transducer.

53. The device of claim 52 wherein the first interface is an audio input jack, the second interface is a first wireless receiver, and the third interface is a second-wireless receiver.

54. The device of claim 53 comprising:

mode selection logic to select between one of the first wireless receiver, the second wireless receiver, and the audio input jack to receive a respective one of the first wireless audio signal, the second wireless audio signal, and the wireline signal in response to a user input; and volume control logic to increase or decrease a perceived volume of the first wireless audio signal, the second wireless audio signal, and the wireline audio signal from the selected one of the first wireless receiver, the second wireless receiver, and the audio input jack.

55. The device of claim 51 comprising:

means within the housing to inductively couple power to recharge an implanted power source.

* * * * *

UNITED STATES PATENT AND TRADEMARK OFFICE

CERTIFICATE OF CORRECTION

PATENT NO. : 6,620,094 B2
DATED : September 16, 2003
INVENTOR(S) : Miller

It is certified that error appears in the above-identified patent and that said Letters Patent is hereby corrected as shown below:

Column 3,
Line 56, delete the word "or.fully", and insert therefor -- or fully --.

Column 11,
Lines 4 and 5, delete the word "the-audio-input-device", and insert therefor -- the audio input device --;
Line 61, delete the word "transcutaneously.transmit", and insert therefor -- transcutaneously transmit --.

Column 13,
Line 54, delete the words "local table", and insert therefor -- locatable --.

Column 14,
Line 55, delete the word "to.receive", and insert therefor -- to receive --;
Line 61, delete the word "interface-to", and insert therefor -- interface to --.

Column 15,
Line 3, delete the word "second-wireless", and insert therefor -- second wireless --.

Signed and Sealed this

Fourth Day of November, 2003

JAMES E. ROGAN
*Director of the United States Patent and Trademark Office*